United States Patent
Davis et al.

(10) Patent No.: US 9,631,731 B2
(45) Date of Patent: Apr. 25, 2017

(54) DIVERTER VALVE

(71) Applicant: Victaulic Company, Easton, PA (US)

(72) Inventors: Michael J. Davis, Kunkletown, PA (US); Kerry L Dewitt, Perkasie, PA (US); Steven A Wortmann, Slatington, PA (US); William J Reilly, Langhorne, PA (US)

(73) Assignee: Victaulic Company, Easton, PA (US)

( * ) Notice: Subject to any disclaimer, the term of this patent is extended or adjusted under 35 U.S.C. 154(b) by 701 days.

(21) Appl. No.: 13/790,696

(22) Filed: Mar. 8, 2013

(65) Prior Publication Data

US 2013/0248035 A1   Sep. 26, 2013

Related U.S. Application Data

(60) Provisional application No. 61/614,605, filed on Mar. 23, 2012.

(51) Int. Cl.
  *F16K 11/076*   (2006.01)
  *B65G 53/56*   (2006.01)

(52) U.S. Cl.
  CPC ............ *F16K 11/076* (2013.01); *B65G 53/56* (2013.01); *Y10T 137/87804* (2015.04)

(58) Field of Classification Search
  CPC ....... B65G 53/56; F16K 11/08; F16K 11/083; F16K 11/0873; F16K 11/0876
  USPC .......................... 137/874, 872, 876; 406/182
  See application file for complete search history.

(56) References Cited

U.S. PATENT DOCUMENTS

| 1,203,395 A | 10/1916 | Palmer |
| 1,725,337 A | 8/1929 | Burkhard |
| 2,268,172 A | 12/1941 | Sinnett |
| 2,593,527 A | 4/1952 | Berck |
| (Continued) | | |

FOREIGN PATENT DOCUMENTS

| DE | 4116465 A1 | 11/1992 |
| EP | 1700801 A1 | 9/2006 |
| (Continued) | | |

OTHER PUBLICATIONS

Copenhaver, Blaine R.; International Search Report from Corresponding International Patent Application No. PCT/US2013/033055; pp. 1-2; May 31, 2013; United States Patent and Trademark Office as International Searching Authority.
(Continued)

*Primary Examiner* — Michael R Reid
(74) *Attorney, Agent, or Firm* — Ballard Spahr LLP

(57) ABSTRACT

A valve for diverting the flow of fluid has a housing with an inlet and a plurality of outlets arranged in spaced relation around the housing. A body is positioned within the housing. The body is rotatable relatively to the housing and has an intake port and an exhaust port joined by a void space. The intake port is aligned with the housing inlet and both the intake port and the housing inlet are coaxially aligned with the axis of rotation of the body. The exhaust port is positioned eccentric to the axis and may be aligned with any one of the plurality of housing outlet ports upon rotation of the body relatively to the housing. A seal is positioned between the body and the housing. The seal surrounds the outlets and the exhaust port to prevent leakage when the exhaust port is aligned with an outlet.

12 Claims, 3 Drawing Sheets

(56) References Cited

U.S. PATENT DOCUMENTS

| | | | |
|---|---|---|---|
| 2,825,604 | A | 3/1958 | Sebestyen |
| 3,194,267 | A | 7/1965 | Lyon |
| 3,199,537 | A | 8/1965 | Swanson |
| 3,411,986 | A | 11/1968 | Buchberger et al. |
| 4,049,105 | A | 9/1977 | Kindersley |
| 4,264,244 | A | 4/1981 | Steele |
| 4,758,235 | A | 7/1988 | Tu |
| 5,727,595 | A | 3/1998 | Eminger |
| 5,814,130 | A | 9/1998 | Lemcoff et al. |
| 7,086,131 | B2 * | 8/2006 | Gibb et al. ............ 29/282 |
| 2010/0032033 | A1 | 2/2010 | Okabe |

FOREIGN PATENT DOCUMENTS

| | | |
|---|---|---|
| FR | 2012132 A1 | 3/1970 |
| GB | 2330397 A | 4/1999 |
| SU | 514762 A1 | 5/1976 |
| WO | 2010029395 A2 | 3/2010 |

OTHER PUBLICATIONS

Copenhaver, Blaine R.; Written Opinion of the International Searching Authority from Corresponding International Patent Application No. PCT/US2013/033055; pp. 1-4; United States Patent and Trademark Office as International Searching Authority, May 31, 2013.

Podratsky, Andreas; Supplementary European Search Report from corresponding European patent application No. 13764090; Jun. 30, 2015; European Patent Office, Munich, Germany.

Podratsky, Andreas; Search Opinion from corresponding European patent application No. 13764090, Jun. 30, 2015; European Patent Office, Munich, Germany.

* cited by examiner

DIVERTER VALVE

CROSS REFERENCE TO RELATED APPLICATION

This application is based upon and claims priority to U.S. Provisional Application No. 61/614,605, filed Mar. 23, 2012 and hereby incorporated by reference in its entirety.

FIELD OF THE INVENTION

This invention concerns valves used to divert flow from one path to one of several different paths.

BACKGROUND

Various industrial processes require a valve which can direct the flow of a fluid to one of a number of different paths. Such valves would find extensive use for redirecting flows comprising particulate matter, such as polyethylene pellets for blow molding operations, as well as slurries comprising mining tailings or crushed stone, ash, as well as bulk granular substances such as grain, sand and the like. One process in particular, paste backfill of mineshafts, is of significant interest. Paste backfill is currently pumped back into mineshafts to fill the voids left by the mining process. During the backfill process, the main backfill supply line needs to be directed to multiple mine shafts. Without a valve which can direct the flow to one of a number of different mineshafts, entire sections of the supply pipe need to be disconnected and reconstructed manually to direct the flow to the desired location. There is clearly a need for a diverter valve which can selectively direct a fluid flow to one of a plurality of locations so as to avoid the need to repeatedly construct and deconstruct piping networks every time the desired location of the fluid changes.

SUMMARY

The invention concerns a valve for diverting the flow of a fluid between one of several different paths. In one example embodiment, the valve according to the invention comprises a housing comprising a sidewall and first and second oppositely disposed end caps attached thereto. The sidewall and the end caps define a chamber. An inlet is positioned in the first end cap. The inlet provides fluid communication to the chamber. A plurality of outlets are positioned in the sidewall. The outlets provide fluid communication to the chamber. A body is positioned within the chamber. The body is rotatable relatively to the housing about an axis coaxially aligned with the inlet. A void space is positioned wholly within the body. The void space has an intake port coaxially aligned with the inlet, and an exhaust port alignable with any one of the plurality of outlets positioned in the sidewall upon rotation of the body. In one example the void space has a diameter and defines a curved path between the intake port and the exhaust port. The curved path may have a radius of curvature no less than three times the diameter of the void space. Furthermore, the void space may have a constant diameter between the intake port and the exhaust port.

In a particular example embodiment, the valve may comprise an opening in the second end cap. A shaft is attached to the body and extends through the opening. The shaft effects rotation of the body relatively to the housing.

In an example embodiment, the valve may further comprise a plurality of tubes attached to the sidewall. Each one of the tubes is in fluid communication with one of the outlets in the sidewall. The chamber may have a conical shape, and the body may also have a conical shape.

An example valve embodiment according to the invention may further comprise a seal positioned within the chamber between the body and the sidewall. In one example the seal comprises a substrate. The substrate may be attached to the sidewall. In this example, the substrate has a plurality of apertures, each the aperture being aligned with one of the outlets in the sidewall. In another example embodiment, the substrate is attached to the body. In this embodiment, the substrate has an aperture aligned with the exhaust port of the void space.

In a particular example embodiment of the valve, the first end cap is removably mounted on said housing. A coupling having a plurality of segments joined end to end may be used to secure the end cap to the housing. The segments surround the housing and the first end cap and retain the first end cap to the housing.

DETAILED DESCRIPTION

Figure 1:
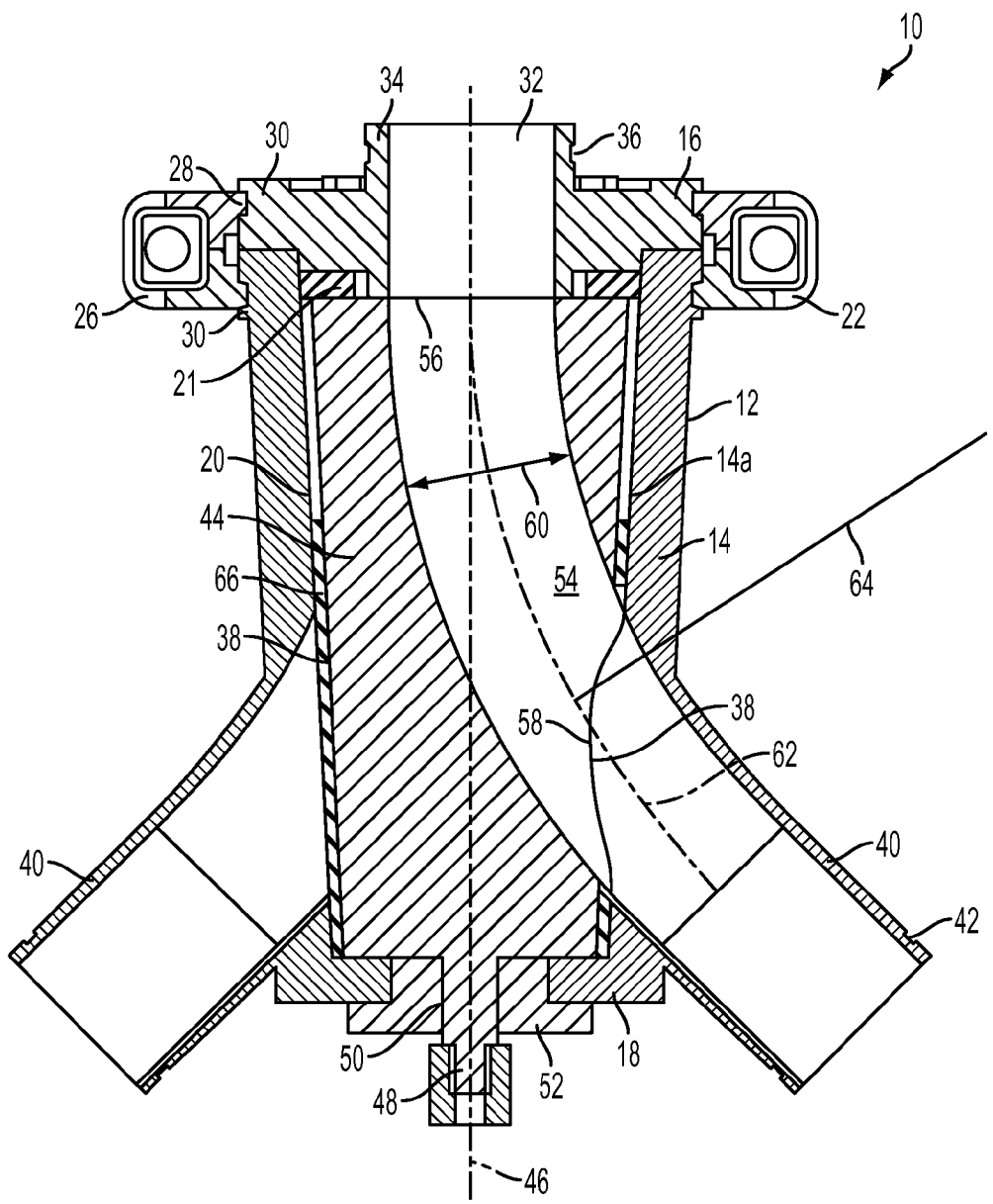
FIG. 1 is a longitudinal sectional view of an example valve embodiment according to the invention.
Figure 2:
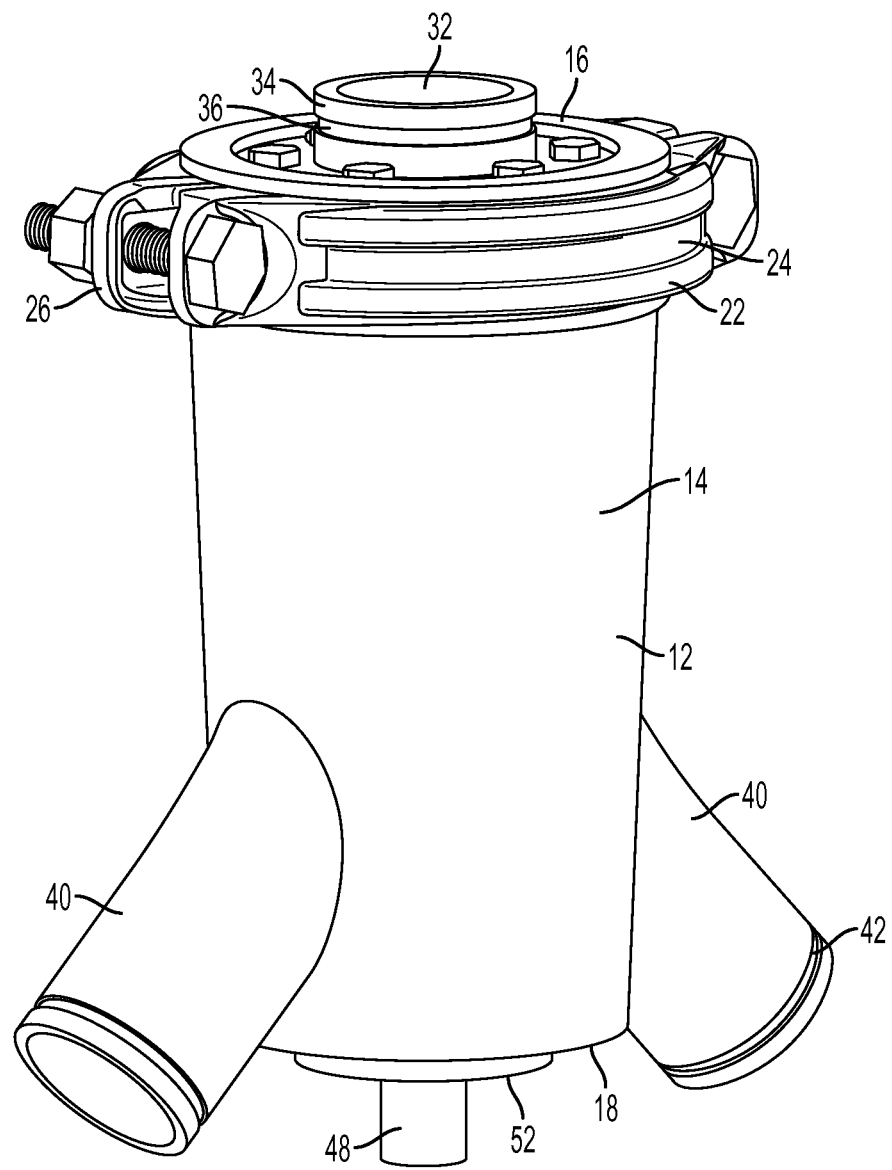
FIG. 2 is an isometric view of the valve shown in FIG. 1.

FIG. 1 shows, in longitudinal cross section, an example valve 10 according to the invention. Valve 10 comprises a housing 12. Housing 12 includes a sidewall 14 having first and second end caps 16 and 18. The end caps are attached to the sidewall opposite to one another. Together the sidewall and end caps define a chamber 20. In this example the second end cap 18 is integrally formed with the sidewall 14, whereas the first end cap 16 is a separate component removably attached to the sidewall using a coupling 22. As shown in FIGS. 1 and 2, coupling 22 comprises segments 24 and 26 attached to one another end to end surrounding the sidewall 14 and the end cap 16. Segments 24 and 26 have arcuate keys 28 which project inwardly and engage circumferential grooves 30 in the sidewall 14 and the end cap 16 to provide positive mechanical engagement between the components. Segments 24 and 26 may be attached to one another using adjustable fasteners such as bolts and nuts, permitting removal of the segments and consequently removal of the end cap 16 to permit servicing of the valve 10.

As shown in FIG. 1, an inlet 32 is positioned in the end cap 16. Inlet 32 provides fluid communication with chamber 20, and may comprise a raised nipple 34 to facilitate connection of the valve 10 to a piping network (not shown). In this example nipple 34 has a circumferential groove 36 to permit it to be attached to a pipe element using a mechanical coupling as disclosed in U.S. Pat. No. 7,086,131, hereby incorporated by reference. Other possible attachment features include, for example, a flanged nipple, a threaded nipple, a nipple having a shoulder or shoulder and bead, as well as a plain end nipple.

A plurality of outlets 38 are positioned in sidewall 14. In this example two outlets 38 arranged diametrically opposite to one another are depicted, it being understood that more outlets are feasible. Outlets 38 provide fluid communication with the chamber 20, and each outlet may have a tube 40 attached to the sidewall 14 and aligned and in fluid communication with the outlet to facilitate connection of the valve 10 to pipe elements of a piping network (not shown). Similar to the nipple 34, the ends of tubes 40 may have a feature which provides for attachment with a pipe element. In this example, tubes 40 have a circumferential groove 42, but flanged tubes, threaded tubes, tubes having shoulders or shoulder and bead, as well as plain end tubes are also feasible.

Valve 10 further comprises a substantially solid body 44 positioned within the chamber 20. A ring seal 21 is positioned between end cap 16, sidewall 14 and body 44 to seal the interface between the end cap and body and isolate inner surface 14a of sidewall 14 from fluid flowing through the valve 10. Body 44 is rotatable relatively to the housing 12 about an axis 46 which is coaxially aligned with the inlet 32 in end cap 16. A shaft 48 extends from the body 44 to effect its rotation about axis 46. Shaft 48 extends through an opening 50 in the end cap 18, which may have a bearing 52 to support the shaft 48. An actuator, for example a crank, an electric or hydraulic motor (not shown) may be attached to the shaft 48 to rotate it and operate the valve 10.

A void space 54 extends through the body 44. The void space 54 is contained wholly within the body 44; i.e., no part of the inner surface 14a of sidewall 14 forms a border of the void space or is a surface wetted by the fluid flowing through the valve. This configuration provides advantages with respect to valve operation and sealing, as it provides less surface area where solid matter may accumulate and hinder rotation of body 44. It also minimizes the line between the body 44 and the inner surface 14a of sidewall 14 which must be sealed. Additionally, the use of a substantially solid body 44 with a void space 54 permits the valve to withstand both high internal operating pressures and provides long life when used to divert fluids containing abrasive particulate matter. The substantially solid body acts as a sacrificial surface having a long wear life due to its bulk.

Void space 54 has an intake port 56 which is coaxially aligned with the inlet 32. Void space 54 also has an exhaust port 58 which is alignable with any one of the plurality of outlets 38 in the sidewall 14 of the housing 12. Alignment of the exhaust port 58 with an outlet 38 is effected by rotation of the body 44 relative to the housing 12. In the embodiment shown the void space 54 has a diameter 60 and defines a curved path 62 between the intake port 56 and the exhaust port 58. It is advantageous that the diameter 60 be a constant between the intake port 56 and the exhaust port 58, and that the radius of curvature 64 of the curve path 62 be no less than three times the diameter 60. This configuration helps reduce head loss of fluid flowing through the valve 10 and also mitigates turbulent flow which results in eddys which cause increased wear rate when fluids having abrasive particulates flow through the valve.

Figure 3:
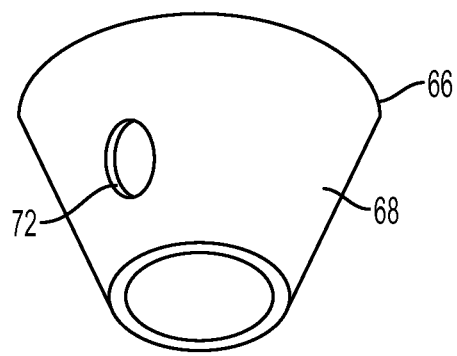
FIG. 3 is an isometric view of an example seal used with the valve shown in FIG. 1.
Figure 4:
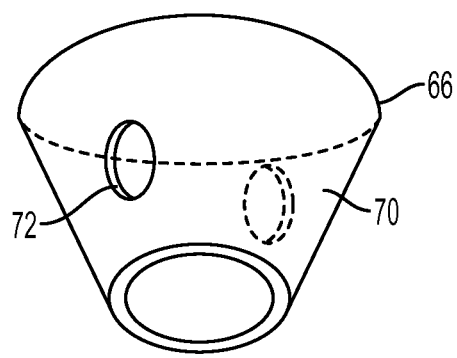
FIG. 4 is an isometric view of another example seal used with the valve shown in FIG. 1.

As shown in FIG. 1, a seal 66 is positioned within the chamber 20 between the body 44 and the sidewall 14. In this example embodiment, as shown in FIGS. 3 and 4, seal 66 comprises a substrate such as 68 or 70 formed of a flexible polymer material such as rubber, synthetic rubber compounds as well as fluoro-polymer compounds such as PTFE, ETFE, and other lubricious substances which resist wear. Substrate 68 is configured for attachment to the body 44. To that end, as shown in FIG. 3, substrate 68 has a single aperture 72 aligned with the exhaust port 58 in body 44. In an alternate embodiment, shown in FIG. 4, substrate 70 is configured to be attached to the inner surface 14a of sidewall 14, and therefore has a plurality of apertures 72, each aligned with an outlet 38 in the sidewall 14.

Because the substrates 68 and 70 are attached to the interfacing surfaces of the body 44 or the sidewall 14 it is advantageous to tailor their shape to that of the body or sidewall. Furthermore, additional advantage may be found by imparting a tapered, conical form to both the body 44 and the sidewall 14 as shown in FIG. 1. Using substantially matching conical shapes for the body 44 and the sidewall 14 facilitate sealing around the outlets and exhaust port and allow the body 44 to be compressed within the housing 12 to compensate for seal wear, thereby extending the life of the seal.

What is claimed is:

1. A valve, comprising:
   a housing comprising a sidewall and first and second oppositely disposed end caps attached thereto, said sidewall and said end caps defining a chamber;
   an inlet positioned in said first end cap providing fluid communication to said chamber;
   a plurality of outlets positioned in said sidewall and providing fluid communication to said chamber;
   a substantially solid body positioned within said chamber, said body being rotatable relatively to said housing about an axis coaxially aligned with said inlet;
   a void space positioned wholly within said body, said void space having an intake port coaxially aligned with said inlet and an exhaust port alignable with any one of said plurality of outlets positioned in said sidewall upon rotation of said body.

2. The valve according to claim 1, further comprising:
   an opening in said second end cap;
   a shaft attached to said body and extending through said opening, said shaft for effecting rotation of said body relatively to said housing.

3. The valve according to claim 1, wherein said void space has a diameter and defines a curved path between said intake port and said exhaust port, said curved path having a radius of curvature no less than three times said diameter of said void space.

4. The valve according to claim 1, wherein said void space has a constant diameter between said intake port and said exhaust port.

5. The valve according to claim 1, further comprising a plurality of tubes attached to said sidewall, each one of said tubes being in fluid communication with one of said outlets in said sidewall.

6. The valve according to claim 1, wherein said chamber has a conical shape and said body has a conical shape.

7. The valve according to claim 1, further comprising a seal positioned within said chamber between said body and said sidewall.

8. The valve according to claim 7, wherein said seal comprises a substrate.

9. The valve according to claim 8, wherein said substrate is attached to said sidewall, said substrate having a plurality of apertures, each said aperture being aligned with one of said outlets.

10. The valve according to claim 8, wherein said substrate is attached to said body, said substrate having an aperture aligned with said exhaust port.

11. The valve according to claim 1, wherein said first end cap is removably mounted on said housing.

12. The valve according to claim 11, further comprising a coupling having a plurality of segments joined end to end, said segments surrounding said housing and said first end cap and retaining said first end cap to said housing.

* * * * *